(12) United States Patent
Gotoh

(10) Patent No.: US 6,907,133 B2
(45) Date of Patent: Jun. 14, 2005

(54) AUTOMATIC SURVEYING SYSTEM

(75) Inventor: Tatsuo Gotoh, Tokyo (JP)

(73) Assignee: PENTAX Corporation, Tokyo (JP)

( * ) Notice: Subject to any disclaimer, the term of this patent is extended or adjusted under 35 U.S.C. 154(b) by 640 days.

(21) Appl. No.: 09/900,013

(22) Filed: Jul. 9, 2001

(65) Prior Publication Data

US 2002/0028016 A1 Mar. 7, 2002

(30) Foreign Application Priority Data

Jul. 19, 2000 (JP) ........................................ 2000-219128

(51) Int. Cl.[7] .............................................. G06K 9/00
(52) U.S. Cl. ........................ 382/106; 382/209; 382/181; 73/1.41; 356/3
(58) Field of Search ................................ 382/106, 315, 382/181, 209, 218; 73/1.41, 1.79; 348/26; 353/5, 101; 359/823; 33/293; 342/357.12; 701/207; 356/3, 141.3

(56) References Cited

U.S. PATENT DOCUMENTS

| | | | | |
|---|---|---|---|---|
| 4,991,302 A | * | 2/1991 | Brewer | 33/367 |
| 5,687,486 A | * | 11/1997 | Foltz | 33/296 |
| 5,777,899 A | * | 7/1998 | Kumagai | 702/94 |
| 5,937,529 A | * | 8/1999 | Brewer | 33/367 |
| 6,011,628 A | * | 1/2000 | Tullis | 356/399 |
| 6,031,606 A | * | 2/2000 | Bayer et al. | 356/141.5 |
| 6,108,920 A | * | 8/2000 | Kinoshita | 33/293 |
| 6,209,210 B1 | * | 4/2001 | Stout | 33/293 |
| 6,381,006 B1 | * | 4/2002 | Ramstrom | 356/4.01 |
| 6,384,725 B1 | * | 5/2002 | Dong | 340/540 |
| 6,529,852 B2 | * | 3/2003 | Knoll et al. | 702/150 |
| 6,556,287 B1 | * | 4/2003 | Dennis | 356/138 |
| 6,573,981 B2 | * | 6/2003 | Kumagai et al. | 356/4.08 |
| 6,578,512 B2 | * | 6/2003 | Truax | 116/209 |
| 6,678,016 B1 | * | 1/2004 | Hanaoka | 348/841 |
| 6,819,113 B2 | * | 11/2004 | von Wimmerspeg | 324/345 |
| 2002/0054716 A1 | * | 5/2002 | Chiba | 382/312 |
| 2002/0149764 A1 | * | 10/2002 | Kumagai et al. | 356/139.1 |
| 2003/0154611 A1 | * | 8/2003 | Cheng-I | 33/367 |

FOREIGN PATENT DOCUMENTS

| | | |
|---|---|---|
| DE | 3424806 | 8/1985 |
| DE | 19858130 | 6/1999 |

* cited by examiner

Primary Examiner—Yon J. Couso
Assistant Examiner—Barry Choobin
(74) Attorney, Agent, or Firm—Greenblum & Bernstein, P.L.C.

(57) ABSTRACT

An automatic surveying system includes a telescopic optical system; an image pickup device for picking up an image of a graduated face of a level rod, to which the telescopic optical system is to be collimated, and converting the image into image data; a memory which stores therein recognition data of at least one of a pattern, numbers, and scale calibrations, provided on the graduated face of the level rod; and an analyzing device for analyzing and recognizing the picked-up image of the at least one of the pattern, numbers, and scale calibrations of the level rod, based on the image data of the level rod picked up by the image pickup device and the recognition data of the pattern, numbers, and scale calibrations, read from the memory, to obtain a measurement.

12 Claims, 13 Drawing Sheets

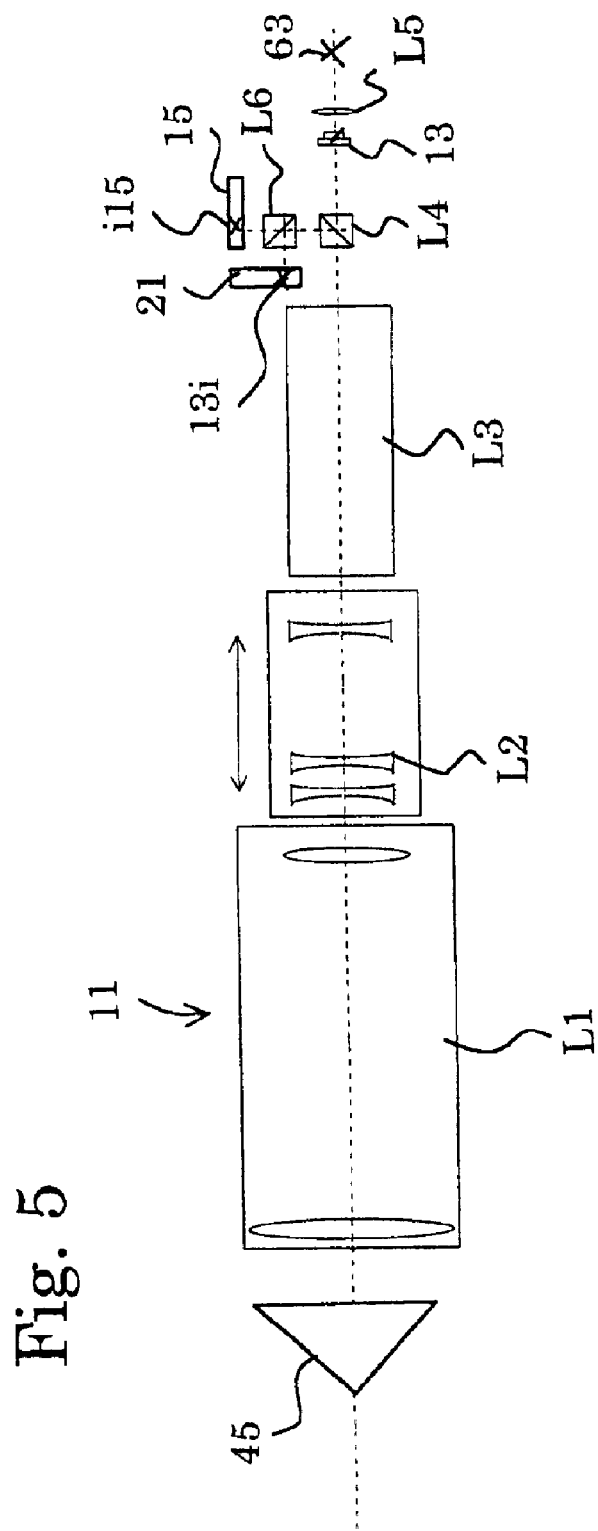

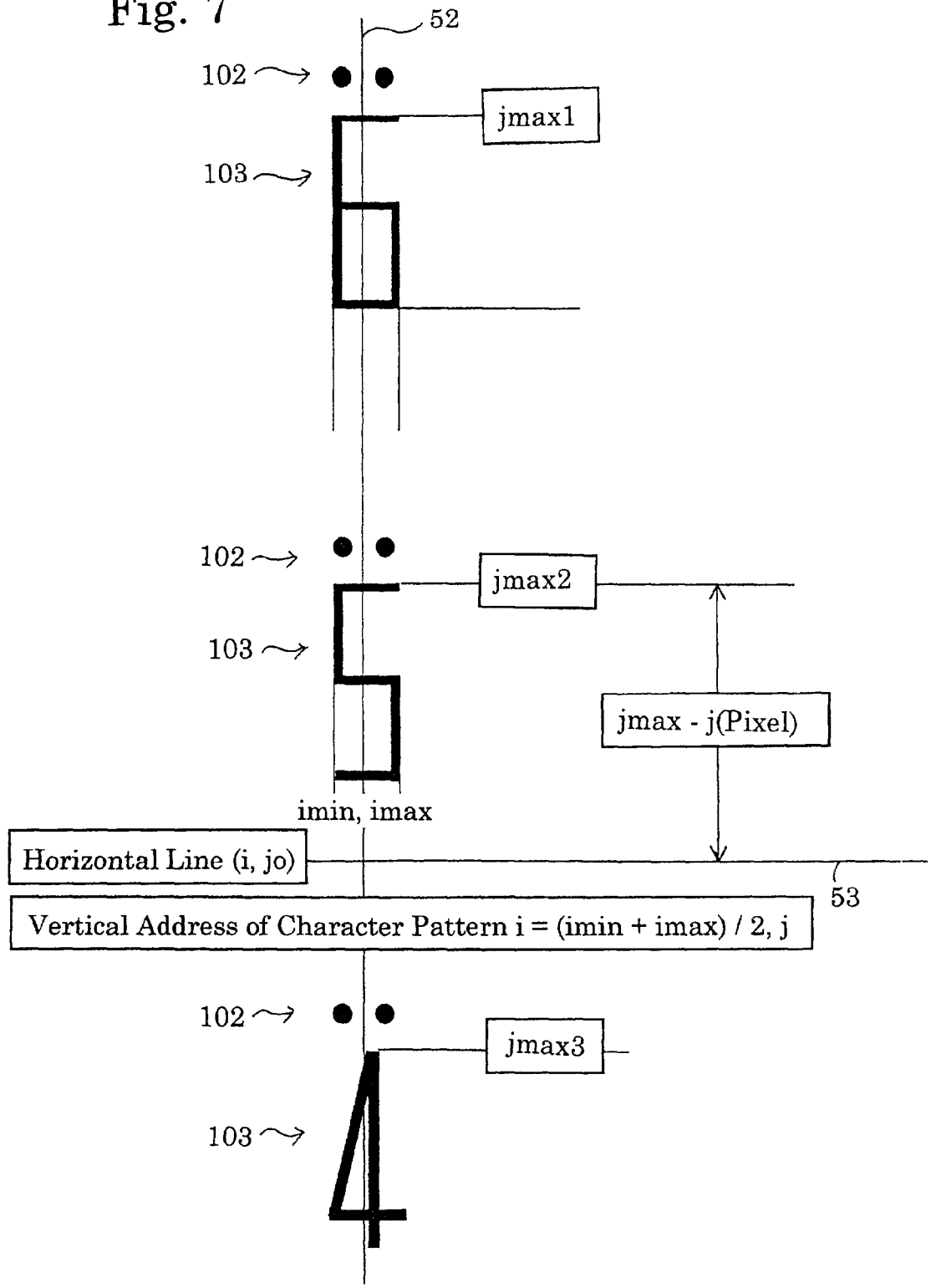

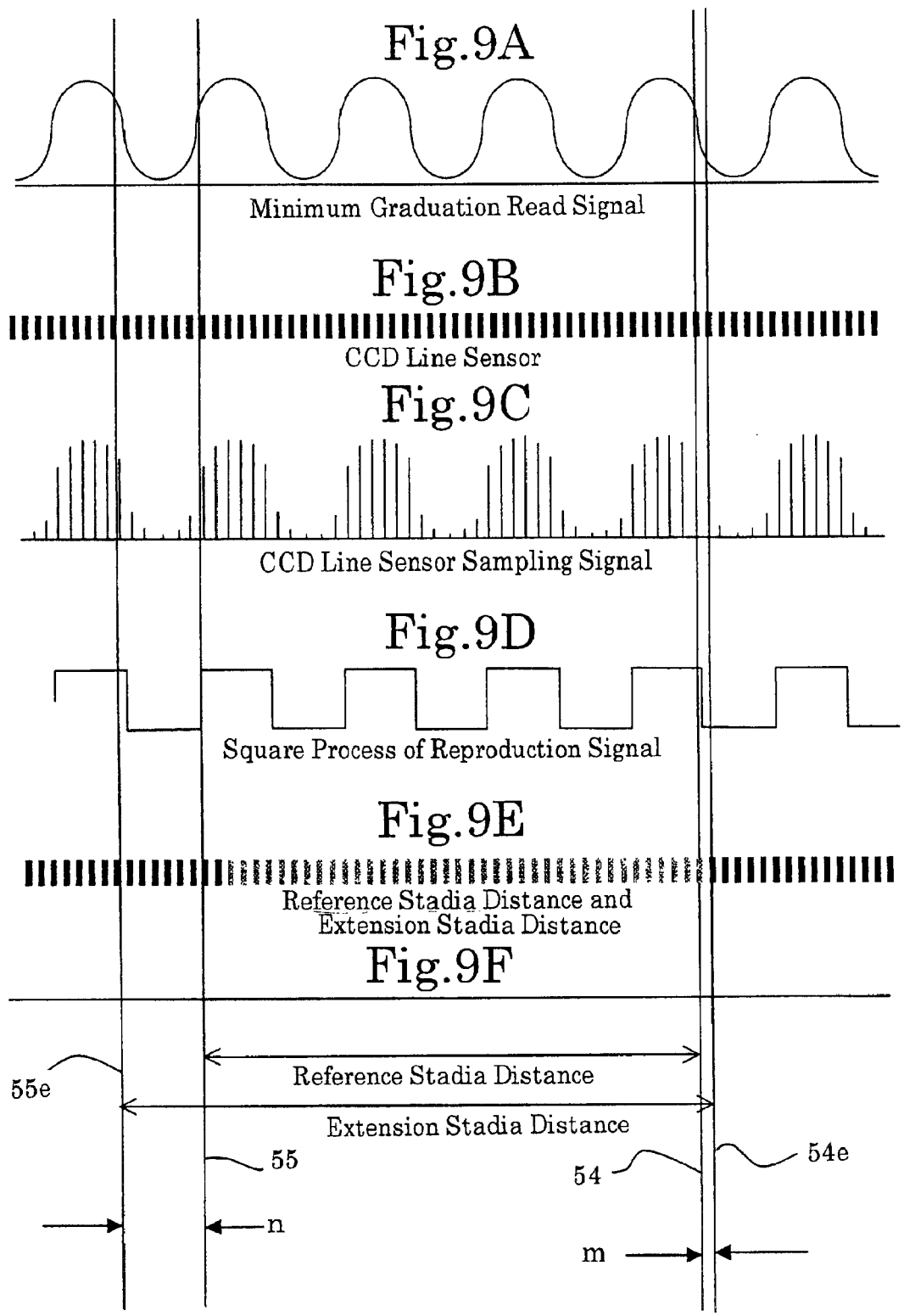

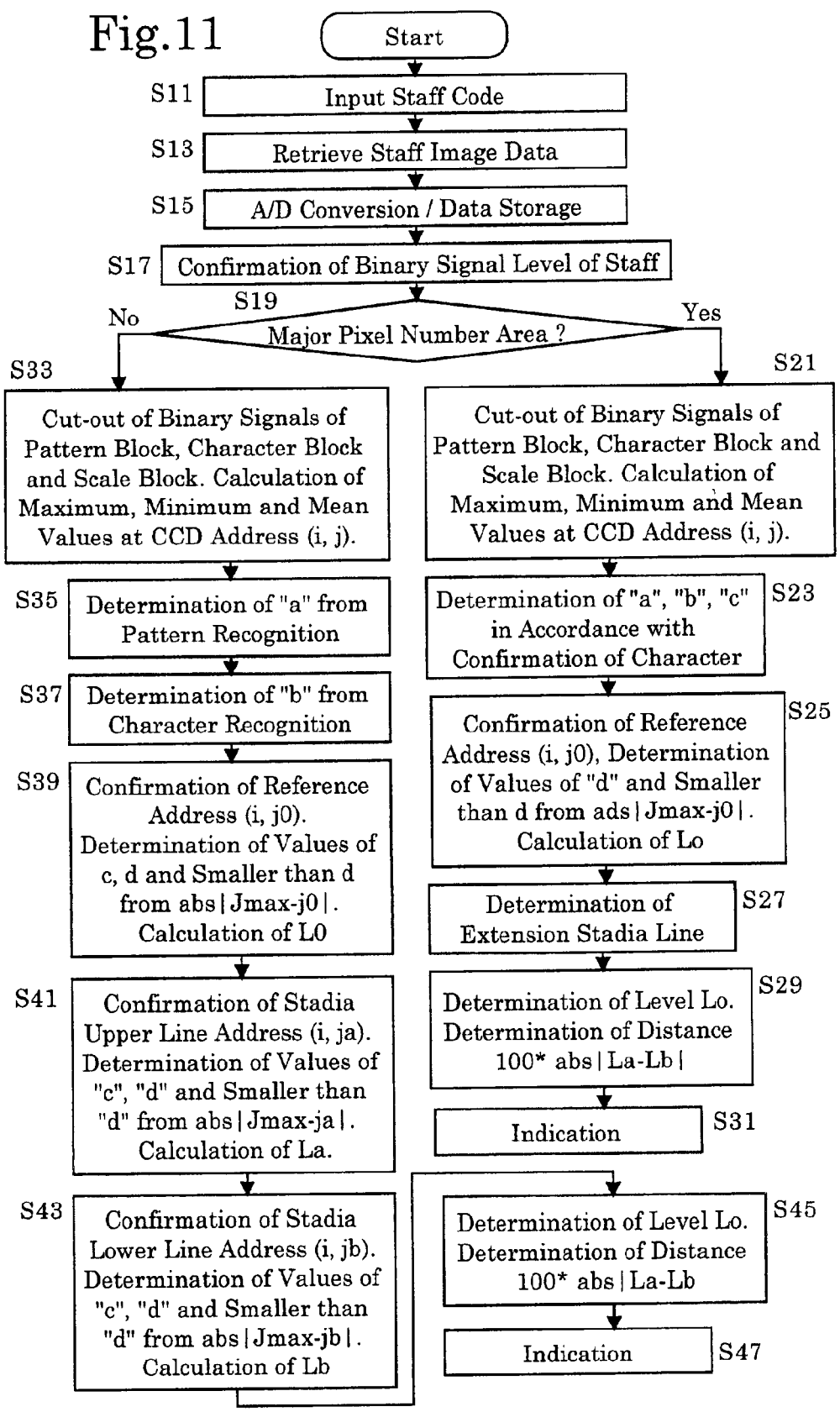

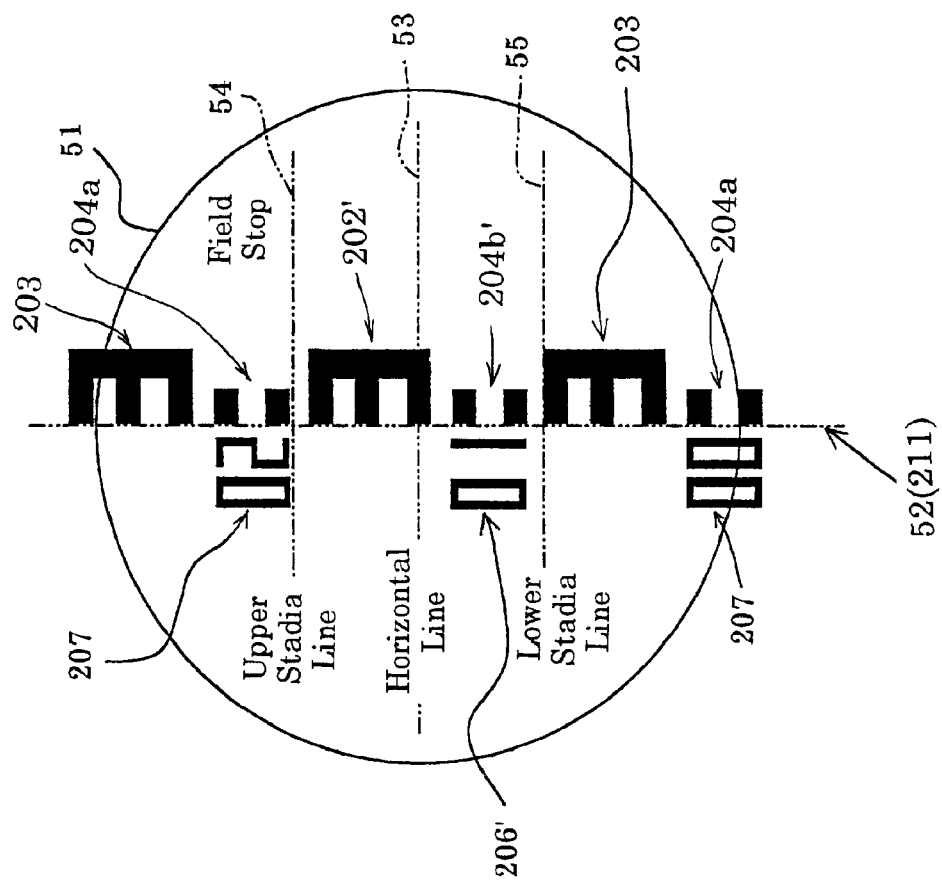

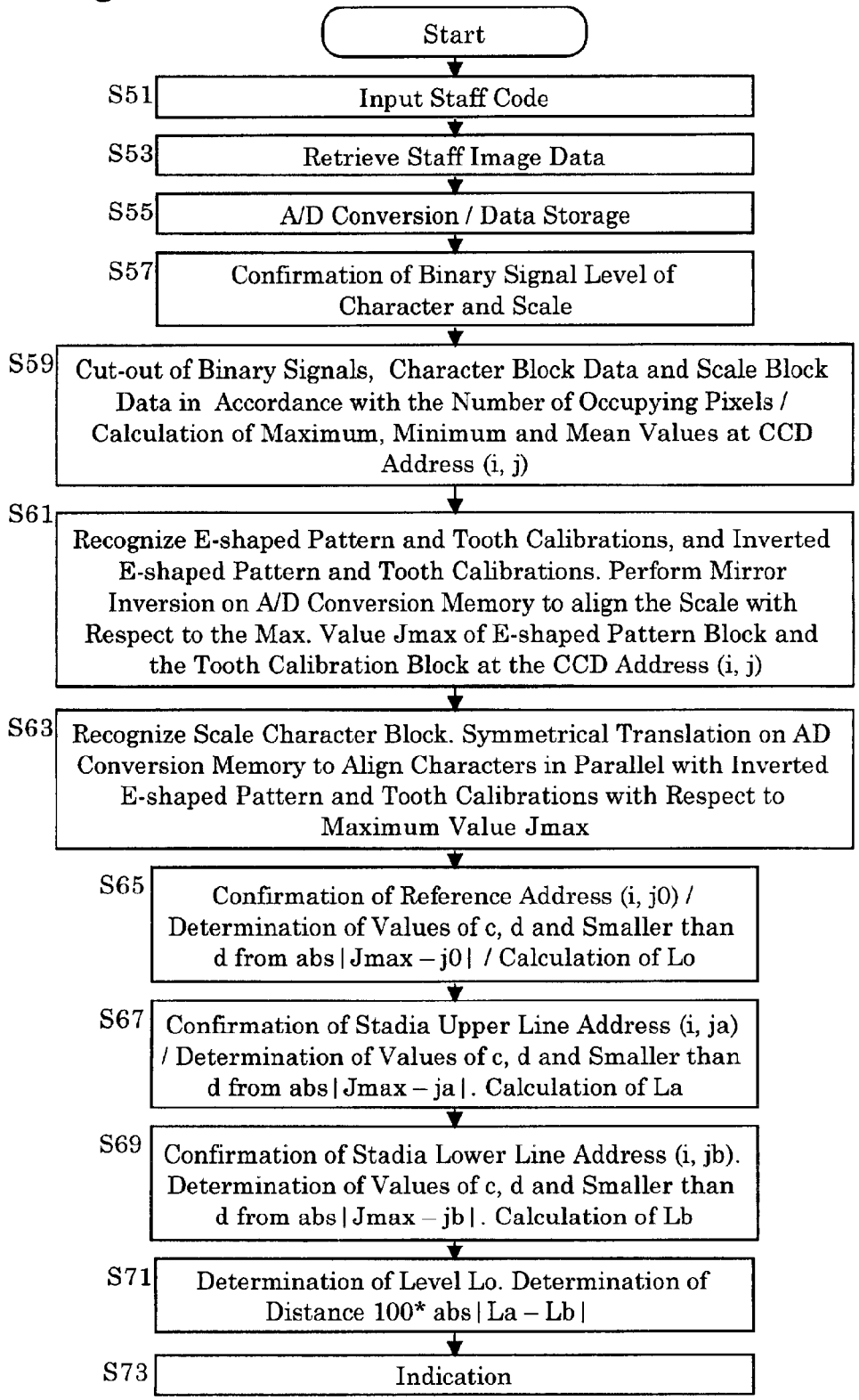

AUTOMATIC SURVEYING SYSTEM

BACKGROUND OF THE INVENTION

1. Field of the Invention

The present invention relates to an automatic surveying system which can electrically read a scale indicated on a graduated face of a level rod, a staff, or a rod, etc., mainly used for leveling.

2. Description of the Related Art

For a leveling operation, various kinds of levels are known, such as a digital level or an electronic level which electrically reads a scale of a level rod. In a digital level, a special-purpose staff coated with special codes is incorporated in a measuring system, so that an image of the special codes formed on the staff is picked-up by a collimating telescope and an electronic image pickup device. Image data of the picked-up image is analyzed by an analyzing device such as a micro computer to measure and indicate a level or distance.

However, in a conventional digital level, if a general-purpose staff (available on the market) is used, it is impossible to analyze or distinguish the scale or numbers indicated on the general-purpose staff. Therefore, the level or distance cannot be automatically read using a staff other than the special-purpose staff. If the special-purpose staff is used, visual survey through an eyepiece of the collimating telescope of the digital level cannot be carried out.

SUMMARY OF THE INVENTION

It is an object of the present invention to eliminate the drawbacks of the conventional digital level by providing an automatic surveying system in which the level or distance can be automatically read using a general-purpose staff.

To achieve the object mentioned above, according to the present invention, an automatic surveying system is provided, including a telescopic optical system; an image pickup device for picking up an image of a graduated face of a level rod, to which the telescopic optical system is to be collimated, and converting the image into image data; a memory which stores therein recognition data of at least one of a pattern, numbers, and scale calibrations, provided on the graduated face of the level rod; and an analyzing device for analyzing and recognizing the picked-up image of the at least one of the pattern, numbers, and scale calibrations of the level rod, based on the image data of the level rod picked up by the image pickup device and the recognition data of the pattern, numbers, and scale calibrations, read from the memory, to obtain a measurement.

With this structure, different kinds of general-purpose level rods can be used by storing the recognition data regarding the pattern, figures, or the scale of the level rod to be used.

Preferably, a selection device for selecting recognition data corresponding to a level rod selected from different kinds of level rods, wherein the analyzing device reads the recognition data, corresponding to the selected level rod, selected by the selection device from the memory.

Preferably, an indication device is provided for indicating the measurement obtained by the analyzing device.

In an embodiment, the analyzing device determines the amount of image data of the level rod in the image width direction based on the image data of the level rod, and performs the analysis based on the amount of the image data thus obtained.

The analyzing device can determines the amount of image data of the at least one of the pattern, numbers, and the scale calibrations in one of the image width direction and the image height direction, based on the image data of the level rod, and performs the analysis based on the amount of the image data thus obtained.

In an embodiment, the analyzing device recognizes the values of the pattern, numbers, and the scale calibrations which coincide with a predetermined reference line within the field of view of the telescopic optical system.

In an embodiment, the telescopic optical system includes an auto-level collimating telescope, the auto-level collimating telescope including an objective optical system; a focusing optical system; a compensating/erecting optical system, a focusing plate, and an eyepiece optical system, in that order from the object side; and a beam splitter which is provided between the compensating/erecting optical system and the focusing plate to split object image carrying light into one light bundle which is incident upon the eyepiece optical system and another light bundle which is incident upon the image pickup device.

In an embodiment, the memory device stores therein in advance coordinates on a light receiving surface of an image pickup element on which a horizontal line and a stadia line of the focusing plate are to be formed, so that one of the coordinates of the graduated face of the level rod coincidental with each line and the distance between the lines on the graduated face can be analyzed based on the stored coordinates and the coordinates of the image picked-up by the image pickup device, on the light receiving surface of the image pickup element.

The memory device can store the measurement obtained by the analyzing device.

The present disclosure relates to subject matter contained in Japanese Patent Application No.2000-219128 (filed on Jul. 19, 2000) which is expressly incorporated herein by reference in its entirety.

BRIEF DESCRIPTION OF THE DRAWINGS

The invention will be discussed below in detail with reference to the accompanying drawings, in which:

FIG. 5 is a schematic view showing how to set coordinates of a line of a focusing plate on a area sensor of the digital level shown in FIG. 1;

FIG. 7 is a view showing the principle to read a scale of a horizontal line in the digital level shown in FIG. 1;

FIGS. 9A through 9F are timing charts of the calculation operation of fractions of a scale in the digital level shown in FIG. 1;

FIG. 11 is a flow chart of an automatic digital level reading operation of the digital level of FIG. 1, when a general-purpose staff shown in FIG. 4 is used;

FIG. 13 is a schematic view of a restructured image in a memory when the European staff shown in FIG. 12 is used; and FIG. 14 is a flow chart of a digital surveying operation when the European staff shown in FIG. 12 is used, according to the present invention.

DESCRIPTION OF THE PREFERRED EMBODIMENT

Figure 1:
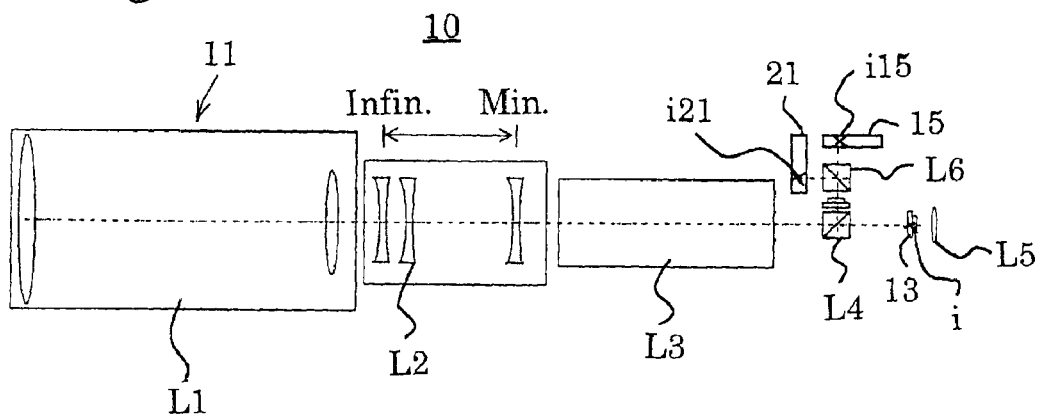
FIG. 1 is a light path diagram of an embodiment of an optical system in a digital level to which an automatic surveying system of the present invention is applied.

FIG. 1 shows an embodiment of an optical system of a digital level (automatic surveying system/telescopic optical system) 10 to which a surveying system of the present invention is applied.

Figure 4:
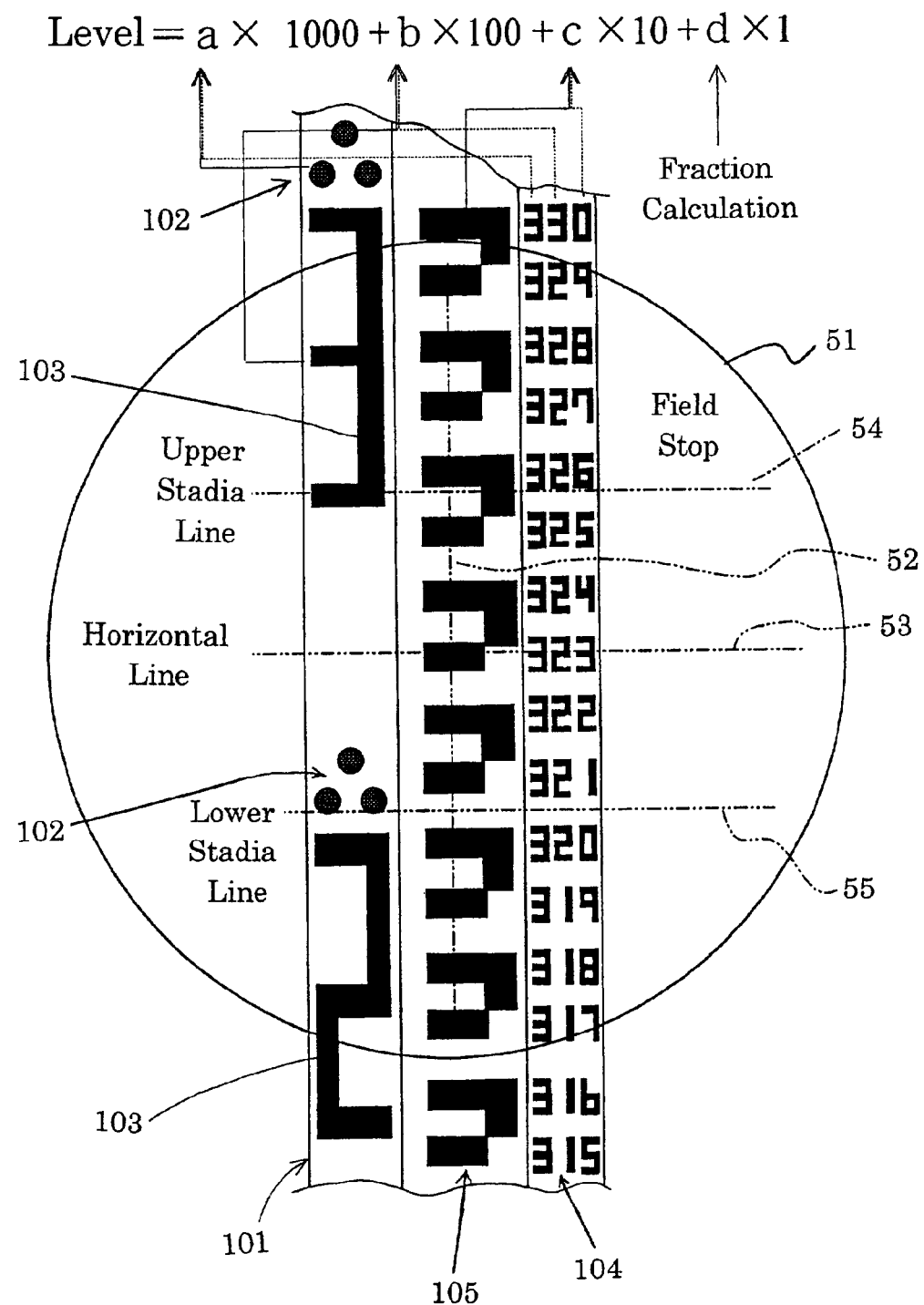
FIG. 4 is a view showing the relationship between the field of view of a collimating telescope of the digital level shown in FIG. 1 and a calibrated scale of a general-purpose staff.

The digital level 10 is provided, as a collimating telescope 11, with an objective lens group (objective optical system) L1, a focusing lens group (focusing optical system) L2, a compensating/erecting optical element (compensating/erecting optical system) L3, a first beam splitting optical element (beam splitting optical system) L4, a focusing plate 13, and an eyepiece lens (ocular optical system) L5, in this order from the object side. When a staff (e.g., a first staff 101 of FIG. 4) is collimated using the collimating telescope 11, an image of the graduated face of the staff is formed as an erect real image on the focusing plate 13. An operator views the image of the staff formed on the focusing plate 13, through the eyepiece lens group L5. In general, the focusing plate 13 is provided thereon with a cross (vertical and horizontal lines) and stadia lines (upper and lower stadia lines). The operator views the image of the graduated face of the staff, on which the vertical and horizontal lines and the upper and lower stadia lines overlap, through the eyepiece lens group L5 and reads the pattern, the numbers, and the scale, etc., of the staff to obtain measurements (FIG. 4). A hanging compensating erecting prism, for example, can be used as a compensating/erecting optical element L3.

The digital level 10 includes an AF (automatic focusing) line sensor 15 for detecting a focus state, and an area sensor (image pickup device) 21 for picking up the graduated face of the above-mentioned staff. A light bundle incident upon the first beam splitting optical element L4 is split into two light bundles, one light bundle of which is passed through a split surface L4D (see FIG. 2A) of the first beam splitting optical element L4 toward the eyepiece lens group L5 and another light bundle of which is reflected by the split surface L4D toward the second beam splitting optical element L6. The light bundle reflected toward the second beam splitting optical element L6 is made incident upon the split surface L6D thereof, whereby the light bundle is split a second time by the split surface L6D. In the illustrated embodiment, the AF line sensor 15 is located in a position to receive the light transmitted through the split surface L6D and emitted from an emitting surface of the second beam splitting optical element L6, and the area sensor 21 is located in a position to receive the light reflected by the split surface L6D and emitted from another emitting surface of the second beam splitting optical element L6. The light receiving surfaces of the sensors 15 and 21 are located in positions optically equivalent to the focusing plate 13. Namely, an image i formed on the focusing plate 13 and the images i15, i21 formed on the light receiving surfaces of the sensors 15 and 21, respectively, are equivalent.

The AF line sensor 15 is a phase difference type focus detection sensor. The digital level 10 has an automatic focusing device (not shown) which includes the AF line sensor 15. The automatic focusing device includes a calculation device for determining defocus amount, i.e., the focus state of the image of the object, i.e., in general, the image of the staff, with respect to the focusing plate 13, through the AF line sensor 15, and a lens driving device for moving the focusing lens group L2 along the optical axis, so that the detected defocus amount becomes approximately zero, i.e., the image of the object is made coincident with the focusing plate 13. The digital level 10 is also provided with a manual focus adjusting mechanism which is adapted to control the focus by manually moving the focusing lens group L2.

Figure 2B:
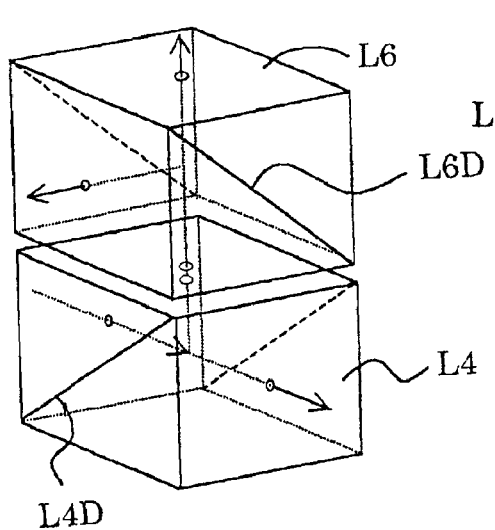
FIGS. 2A and 2B are schematic views of different embodiments of a light path splitting optical system shown in FIG. 1.
Figure 2A:
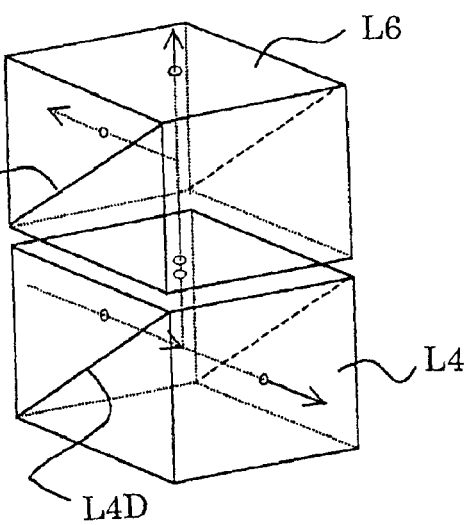

In the illustrated embodiment, although the light bundle is reflected by the split surface L6D of the second beam splitting optical element L6 in the forward direction (toward the object) (FIG. 2A), the direction of reflection is not limited thereto. For instance, as shown in FIG. 2B, it is possible to reflect the light in the lateral direction or in the rearward direction. Moreover, the AF line sensor 15 and the area sensor 21 can be provided in an opposite arrangement.

The main circuit of the digital surveying system of the digital level 10 will be discussed below with reference to FIG. 3. The light receiving surface of the area sensor 21 is optically equivalent to the focusing plate 13. Namely, when the collimating telescope 11 is collimated with respect to the staff, the image of the graduated face of the staff is formed on the light receiving surface of the area sensor 21. The area sensor 21 converts the image formed on the light receiving surface thereof into electric image signals through light receiving elements thereof and outputs the image signals for each pixel. As the area sensor 21 can be used a CCD image pickup device or a MOS image pickup device, etc. In the illustrated embodiment, a conventional CCD area sensor (image sensor) in which all the white-black square pixels are read is used as the area sensor 21.

A series of image pickup operations of the area sensor 21, e.g., sweeping of unnecessary charges, accumulation of charges (image pickup), and outputting of the accumulated charges (outputting of the image signals), are controlled by a clock pulse generated from a timing pulse generator 23.

The image signals output from the area sensor 21 are amplified and converted to digital image signals by a head amplifier/A-D converter 25. the digital image signals output from the head amplifier/A-D converter 25 are sequentially written in a first memory (frame memory) 27 as digital image data and stored as digital image data for one digital image (one frame).

The digital image data for one digital image stored in the first memory 27 is read by an image signal processing circuit 31, is subject to predetermined processes, and is subjected to predetermined image analysis by a main CPU (analyzing device/selection device) 35. The main CPU 35 performs the image analysis operation to analyze and distinguish the image information of the graduated face of the staff picked up by the area sensor 21 to thereby obtain a level and distance. The main CPU 35 indicates information of the level or distance thus obtained in an display panel 37 to inform the operator of such information. Note that a second memory 29 is also used as a work area for image analysis.

An EEPROM 33 stores therein correction information (e.g., an adjusting reference value, a temperature compensation coefficient, and data necessary to analyze and distinguish the pattern, numbers or scale, of the graduated face of the staff, necessary for normal measurement) as staff No. data for a plurality of staffs.

A digital survey (automatic reading operation of level and distance) is carried out when a digital survey start key is turned ON, so that the main CPU 35 reads the data corresponding to the staff code information selected in advance by an operator, using a keyboard 39, from an EEPROM 33. Prior to the reading operation of the level and distance, the automatic focusing operation or manual focusing operation is completed for accurate measurement.

In the illustrated embodiment, two independent power source systems 41 and 43 are provided. The first power source 41 is used for the automatic focusing device and the second power source 43 is used for the main circuit of the digital surveying system. The two power source systems make it possible to carry out the automatic reading operation by the second power source after the manual focusing operation, even if a power supply from the first power source is interrupted, or to carry out the visual survey by the automatic focusing device using the first power source, even if the second power source cannot be used. Note that if only one power source is provided, the survey instrument can be made light and small.

The following discussion will be addressed to the structure of a general-purpose staff which is widely used for surveying and which can be automatically identified by the digital level 10. There are various kinds (grade, material) of general-purpose staffs with a variety of indicia (a series of large and small characters, pattern, scale). A first staff 101, as an example of the most general and simple leveling staff will be explained below. The first staff 101 is a three-stage telescopic level box of aluminum which can measure up to a maximum of 5 meters, in which the uppermost stage has the smallest width of 40 mm.

FIG. 4 shows the graduated face (indication surface) of the first staff 101 viewed in the field of view 51 of the collimating telescope 11. The indicia of the first staff 101 includes a long object-distance pattern 102, a series of large characters 103 for a long-distance object, a series of small characters 104 for a close object, and a scale 105 at pitches of 10 mm. Note that in general, the color of the base of the graduated face of the staff 101 is white and the color of the base of the long object-distance pattern 102, the series of large and small characters 103, 104 and the scale 105 is black or red.

The height of each number in the series of large characters 103 is 50 mm, and the height of each number in the series of small characters 104 is 5 mm. The upper edge of each number in the series of large and small characters 103 and 104 is horizontally flush with the upper edge of the scale (black band) 105 when the staff 101 is set in the vertical position. A position within the portion between each such horizontally flush upper edge constitutes a smaller placing corresponding to, e.g., the series of small characters 104 or the scale 105, of the corresponding number of the series of large characters 103.

The long object-distance pattern 102 is represented by black circular points provided above each character of the series of large characters 103. One black point represents one unit of 1000 mm (1 m). For example, three black points shown in FIG. 4 represent 3000 mm (3 m) and the two black points in FIG. 7 represent 2000 mm (2 m). The series of large characters 103 consists of one-digit numbers, and the unit thereof is 100 mm (10 cm). For example, the number "2" of the series of large characters 103 shown in FIG. 4 represents two units of 100 mm=200 mm. Note that in FIG. 4, the long object-distance pattern 102 consists of three black points which are provided above the number "2" of the series of large characters 103, and therefore, the number "2" of the series of large characters 103 shown in FIG. 4 represents 3000+200=3200 mm.

The series of small characters 104 are represented by three-digit numbers and the unit thereof is 10 mm (1 cm). For example, the number "323" of the series of small characters 104 in FIG. 4 represents 323*10=3230 mm (323 cm or 3 m 23 cm). The scale of 10 mm pitches consists of dark and light bands which are repeatedly alternated at a distance of 5 mm. Note that in visual surveying, in general, the value of ⅕ of the width of the 5 mm white or black bands (i.e., the value up to 1 mm) can be read; however, in the illustrated embodiment, a value smaller than 1 mm can be read via a predetermined fractional calculation.

In a visual surveying operation, the operator reads the level (height level) from the long object-distance pattern 102, the numbers of the series of large and small characters 103 and 104, of the graduated face of the first staff 101, corresponding to the horizontal line (predetermined reference line) 53, and the scale 105 on which the horizontal line 53 overlaps and carries out the calculation using a predetermined formula. The distance can be obtained by reading the number of the scale 105 between the upper and lower stadia lines (predetermined reference lines) 54 and 55 followed by a fractional calculation; and the value thus obtained is substituted in a predetermined formula. Note that designator 52 shown in FIG. 4 represents the vertical line of a cross line. The collimation axis (optical axis) of the collimating telescope 11 passes through the intersection of the vertical line 52 and the horizontal line 53.

The field of view 51 of the collimating telescope 11 is restricted by a field stop of the collimating telescope 11 and is, in general, circular, as shown in FIG. 4. The effective light receiving area of the area sensor 21 can be determined so as to define a circle identical to the field of view 51. However, since the effective light receiving area of the area sensor 21 is usually rectangular, it is possible to encircle the field of view 51 completely by the effective light receiving area of the area sensor 21 or to inscribe or circumscribe the field of view 51 with the effective light receiving area.

The level can be obtained by analyzing and distinguishing the scale (long object-distance 102, the series of large and small characters 103 and 104, and the horizontal line 53) of the first staff 101 on which the horizontal line 53 is overlapped, and by performing a fractional calculation. Namely, assuming that the value of the long object-distance pattern 102 is "a", the value of the series of large characters 103 is "b", the number of the scale in one cycle (cycle number) is "c", and the fraction calculated by a fractional calculation based on the scale 105 is "d", the level (mm) can be obtained by the following equation (1):

$$\text{Level} = a*1000 + b*100 + c*10 + d*1 \tag{1}$$

The distance can be obtained by measuring the number of the dark and light images f on the scale 105 of the first staff 101 between the upper stadia line 54 and the lower stadia line 55. Namely, "au" designates the value of the long object-distance pattern 102 closest to the upper stadia line 54, "bu" designates the value of the series of large characters 103 closest to the upper stadia line 54, and "cu" designates the number of calibrations on the scale 105 between the reference position of the upper series of large characters 103 and the upper stadia line 54, and "du" designates a fraction of a cycle which is calculated by a fractional calculation method. Likewise, "al" designates the value of the long object-distance pattern 102 closest to the lower stadia line 55, "bl" designates the value of the series of large characters 103 closest to the lower stadia line 55, "cl" designates the number of calibrations on the scale 105 between the reference position of the series of large characters 103 and the lower stadia line 55, and "dl" designates a fraction of a cycle which is calculation by a fractional calculation method. Consequently, the distance (mm) can be obtained by the following equation (2):

$$\text{Distance} = Sc * \{(au-al)*1000 + (bu-bl) + (cu-cl)*10 + (du-dl)*1\} \quad (2)$$

wherein Sc designates the stadia multiplier of the digital level 10 (collimating telescope 11).

In a stadia surveying operation in the illustrated embodiment, the fractions du and dl can be determined by the following fractional calculation. The distance between the upper stadia line 54 and the lower stadia line 55 is increased or decreased corresponding to the number of pixels of the digital image, so that the number of the calibrations on the scale 105 in one cycle is an integer. The stadia distance which is obtained from the number (an integer) of the calibrations on the scale 105 is referred to as an increased stadia distance, wherein the number of the increased pixels is obtained by du−dl. The increased stadia multiplier Sc' when the increased stadia is obtained is given by objective focal length/increased stadia distance.

In the digital level 10 of the illustrated embodiment, a light bundle incident upon the objective lens group L1 is split (twice) and is made incident upon the area sensor 21 before the light bundle reaches the focusing plate 13. Consequently, the image of the horizontal line 53 and the stadia lines 54 and 55 are not formed on the area sensor 21. Therefore, the coordinates of the area sensor 21 (pixel position in the vertical direction), at which the images of the horizontal line 53 and the stadia lines 54 and 55 would be formed, are measured in advance, and the measured coordinates (i, j0), (i, ja), (i, jb) are stored in the EEPROM 33. The coordinates (i, j0), (i, ja), (i, jb) are read from the EEPROMM 33 and are used in a digital surveying operation.

The measuring and setting (reference transfer adjustment) operations of the coordinates of the horizontal line 53, upper stadia line 54 and lower stadia line 55 on the light receiving surface of the area sensor 21 will be explained below with reference to FIG. 5, by way of example. First, the focusing lens group L2 of the collimating telescope 11 is moved to an infinite focal position and the diopter is adjusted. Thereafter, an illuminating light source 63 which emits parallel rays is placed at the front principal point of the eyepiece lens. A corner-cube prism 45 is placed immediately in front of the objective lens group L1 of the collimating telescope 11 and is secured to the lens barrel. In this state, when the illuminating light source 63 is turned ON, the light thereof entering the eyepiece lens L5 and transmitted through the focusing plate 13 is transmitted through the first beam splitting optical element L4, the compensating/erecting optical element L3, the focusing lens group L2, and the objective lens group L1. Thereafter, the light is incident on the corner-cube prism 45 and is reflected by the corner-cube prism 45 back through the objective lens group L1, the focusing lens group L2, the compensating/erecting optical element L3, is reflected by the first and second beam splitting prisms L4 and L5, is received by the area sensor 21; and forms a transfer dark image 13i of the focusing plate 13 on the area sensor 21. The transfer dark image 13i is picked up by the area sensor 21, and the address of the minimum value of the photoelectrically converted dark image (intermediate value of the line image) is accurately determined by interpolation up to a value smaller than the pixel pitch to thereby determine the addresses of the horizontal line 53, upper stadia line 54 and lower stadia line 55. Thereafter, the coordinate data (addresses) of the horizontal line 53, upper stadia line 54 and lower stadia line 55 are stored in the EEPROM 33 to complete the reference transfer adjustment. The coordinate data thus obtained and stored in the EEPROM 33 is read from the EEPROM 33 and used when the automatic measurement of the distance is carried out.

Figure 3:
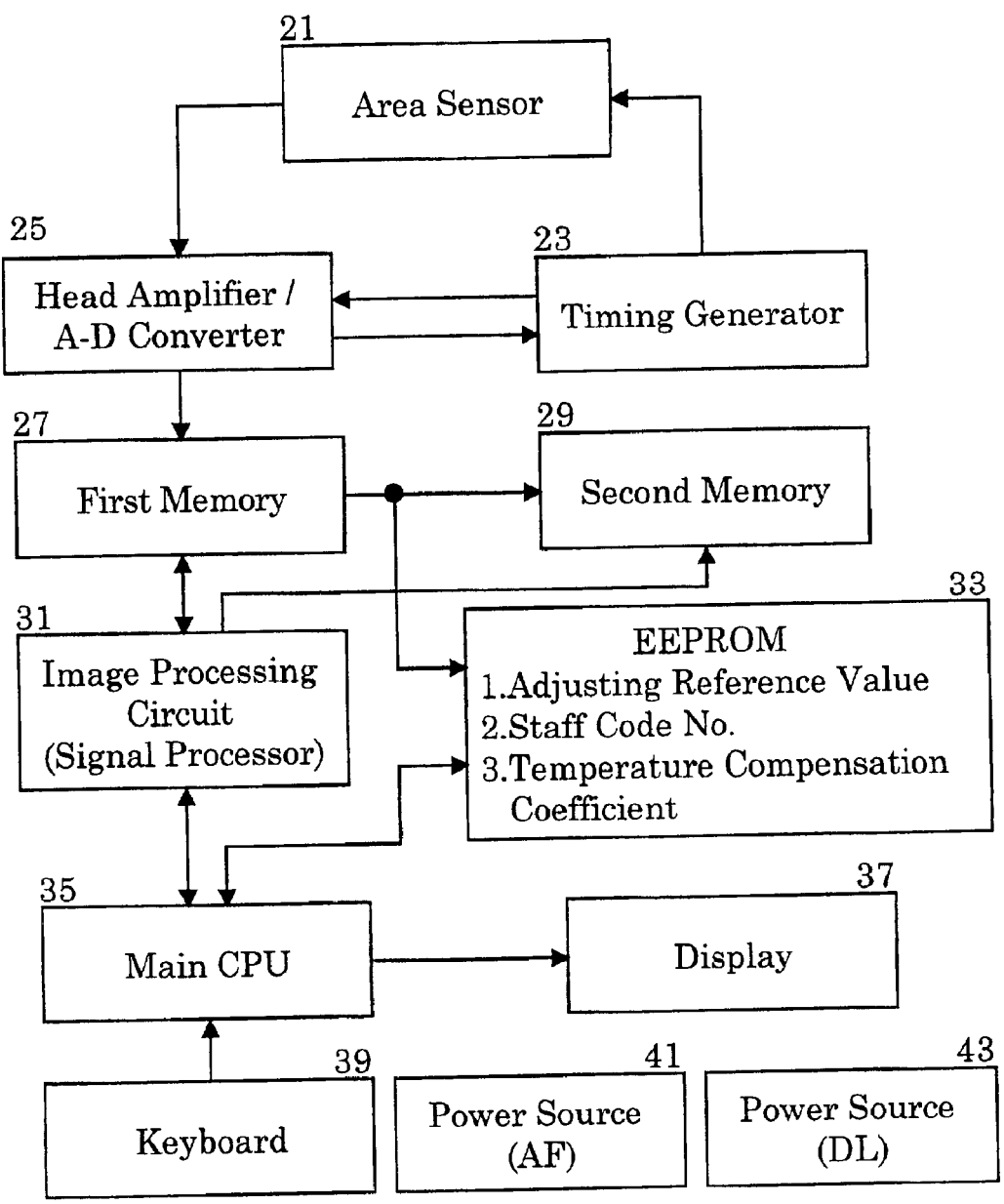
FIG. 3 is a block diagram of an embodiment of the circuit construction of a digital surveying system of the digital level shown in FIG. 1.

In the illustrated embodiment, as shown in FIG. 3, the image of the graduated face of the first staff 101 to which the collimating telescope is collimated, is picked up by the area sensor 21, is converted to digital image data by the head amplifier/A-D converter 25, is analyzed by the image signal processing circuit 31 and the main CPU 35 to calculate accurate level and distance, is indicated in the display 37, and is stored in a memory or output to an external device as the automatic measurement data.

In the first staff 101 which can measure a level height from 1 meter up to approximately 5 meters, indication in thousands of millimeters (meters) is recognized by the long object-distance pattern 102, indication in hundreds of millimeters is recognized by the series of large characters 103 having a height of 50 mm (i.e., five 10 mm cycles of the scale 105), indication in tens of millimeters is recognized by the series of small characters 104 and the scale 105, and indication in millimeters or less than 1 mm is recognized by the scale 105 and by being subject to a fractional calculation.

Figure 6A:
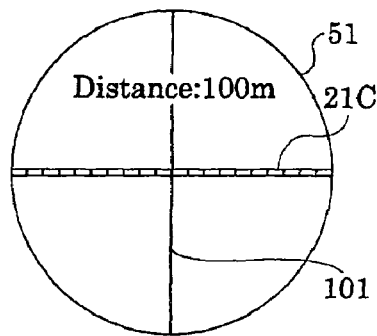
FIGS. 6A through 6F are views showing the relationship between the field of view of a collimating telescope of the digital level of FIG. 1 and the size of an image of a general-purpose staff, at different distances.
Figure 6D:
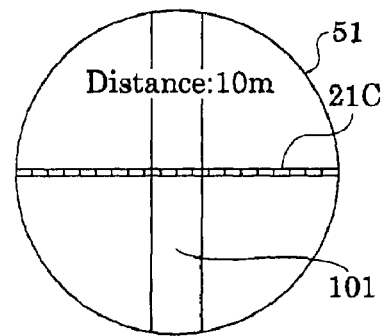
Figure 6B:
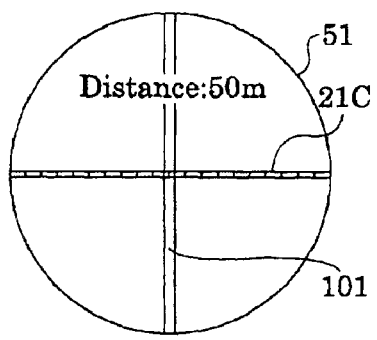
Figure 6E:
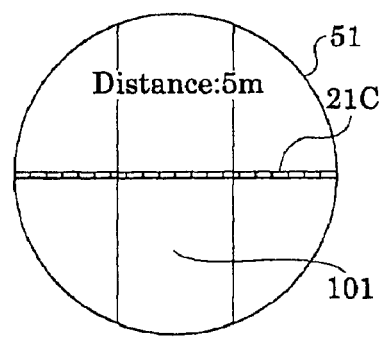
Figure 6C:
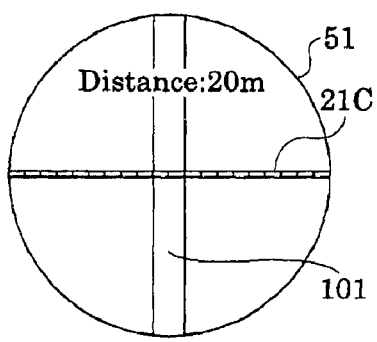
Figure 6F:
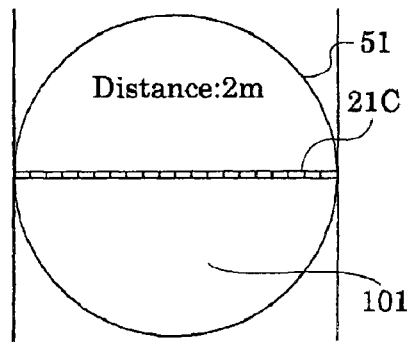

Since it is difficult to provide a zooming function in the objective lens group of the automatic surveying system (digital level 10) because the horizontal level accuracy is reduced, it is necessary to analyze the image of the graduated face of the staff based on the image data obtained by the collimating telescope having a fixed magnification. Therefore, the number of pixels of the digital image of the staff or the image width varies depending on the distance of the staff. FIGS. 6A through 6F show different sizes of the digital image. FIGS. 6A through 6F show the relationship between the width of the image of the staff and the diameter of the field stop (field diameter) on the light receiving surface (image pickup surface) of the area sensor 21, when the distance is 100 m (FIG. 6A), 50 m (FIG. 6B), 20 m (FIG. 6C), 10 m (FIG. 6D), 5 m (FIG. 6E), and 2 m (FIG. 6F). In FIGS. 6A through 6F, the field diameter of the digital image is 6.3 mm and the value of one calibration of a scale 21C in the horizontal direction is 0.3 mm.

The relationship between the image width (mm), the cycle width (mm) of the scale 105 at the image surface, and the number of pixels of the scale 105 pertaining thereto, when the image of the uppermost stage of the first staff 101 of the width (40 mm) is formed on the light receiving surface of the area sensor 21 at each distance of the first staff 101 is shown in table 1 below.

TABLE 1

| Distance (m) | Image Width (mm) | Scale Cycle Width (mm) | Pixels which Occupy Scale (Number) |
|---|---|---|---|
| 100 | 0.108 | 0.027 | 5 |
| 50 | 0.216 | 0.054 | 11 |
| 20 | 0.544 | 0.136 | 29 |
| 10 | 1.096 | 0.274 | 58 |
| 5 | 2.236 | 0.559 | 120 |
| 2 | 5.904 | 1.476 | 317 |

As can be understood from the above description, the ratio of the surface area of the images of the indication elements of the graduated face of the first staff 101 to the light receiving surface of the area sensor 21 varies in accordance with the distance to the first staff 101, wherein the series of large characters 103 or the series of small characters 105 can or cannot be recognized. For instance, if the first staff 101 is located at a close object distance, there is a possibility that the picked-up image of the first staff 101 is too large or the image pickup area is too small to contain the long object-distance pattern 102 or the series of large characters 103 in the image pickup surface, thus resulting in no recognition thereof. Moreover, at the close object distance, the series of large characters 103 may have such a large number of pixels that the recognition requires a long time. Conversely, if the first staff 101 is located at a long object distance, there is a possibility that the picked-up image of the first staff 101 is so small that the number of the pixels occupying the image of the indication element is too small to distinguish the series of small characters 104. Moreover, the series of small characters may have such a small number of pixels that the recognition accuracy is deteriorated. To avoid these problems, in the illustrated embodiment, the distinguishing indication elements are selected in accordance with the number of the occupying pixels in the image width direction of the picked-up scale.

In the illustrated embodiment, the long object-distance pattern 102, the series of large and small characters 103 and 104, and the scale 105 are varied in accordance with the number of the pixels occupying the image of the staff in the width direction. Namely, the number of the pixels of the image of the first staff 101 in the width direction is divided into a major pixel number area and a minor pixel number area, based on a predetermined boundary value. An algorithm which analyzes and distinguishes the long object-distance pattern 102, the series of large characters 103, and the scale 105 in the minor pixel number area, and an algorithm which analyzes and distinguishes the series of small characters 104 and the scale 105 in the major pixel number area are set in advance. Upon measurement, the algorithm corresponding to the detected number of the pixels occupying the image of the staff in the width direction is selectively used to distinguish the long object-distance pattern 102, and the values of the series of large characters 103 and the scale 105 or the values of the series of small characters 104 and the scale 105 to thereby determine the level (height) or the distance.

The size of the images of the series of small characters 104 and the series of large characters 103 is proportional to the image width of the staff 101. Therefore, the numbers 0 to 9 of the series of large and small characters 103 and 104 are represented by a predetermined number of the vertical pixels and a predetermined number of the horizontal pixels, and a table which shows the reference characters converted to binary block data is stored in the EEPROM 33. The binary block data of the reference character corresponding to the image width of the staff obtained through the area sensor 21 is read, and is subject to character-analysis with the corresponding block data cut from the image data picked up by the area sensor 21, by for example, a pattern matching method so as to recognize the numbers of the long object-distance pattern 102, the series of large characters 103 or the series of small characters 104. The scale 105 is recognized by a fraction recognition method.

In the algorithm for the major pixel number area, the pixel data in the vertical direction at the image width which is assumed to contain the series of small characters 104 is read based on the width of the staff image to confirm that the pixel data is coincident with a 10 mm unit change of the three-digit series of small characters 104. Thereafter, the reading block data corresponding to the series of small characters 104 are analyzed and recognized.

In the algorithm for the minor pixel number area, likewise with the algorithm for the major pixel number area, after it is confirmed that the pixel data is coincident with a 1000 mm unit change of the long object-distance pattern 102 and a 100 mm unit change of the series of large characters 103, the pattern 102 and the series of large characters 103 are analyzed and recognized.

If the algorithm for the major pixel number area is selected, the recognition of the values of up to the order of 1000 mm, 100 mm and 10 mm is made by recognizing the numerical value of the series of small characters 104 of a three-digit number, which is indicated on the graduated face of the first staff 101 at 10 mm units in the level height direction. Furthermore, the values of the order of 1 mm and smaller values are obtained by the recognition of the scale 105 and by calculation to achieve an accurate measurement.

If the algorithm for the minor pixel number area is selected, the recognition of the values of up to the order of 1000 mm, 100 mm, 10 mm and 5 mm is made by recognizing the long object-distance pattern 102, the series of large characters 103 and the scale 105. Furthermore, the values smaller than 5 mm are obtained by a fractional calculation method to achieve accurate measurements.

The series of large and small characters 103 and 104 are selected to recognize the number of pixels occupying the image of the first staff 101 in the area sensor 21. The number of pixels depends on the focal length of the objective lens group L1 of the collimating telescope and the set distance of the staff 101. Namely, the number of the occupying pixels is substantially inversely proportional to the distance. Therefore, the number of occupying pixels in the image width direction of the staff 101 is detected; a check is made to determine whether or not the number of occupying pixels is in the major pixel number area or in the minor pixel number area; and the long object-distance pattern 102, the series of large characters 103 and the scale or the series of small characters 104 and the scale 105 are selected.

In the illustrated embodiment, the major pixel number area is set when the number of the occupying pixels is less than 60 which corresponds to the distance more than approximately 10 m, and the minor pixel number area is set when the number of the occupying pixels is identical to or more than 60 which corresponds to the distance less than approximately 10 m.

An approximate value of the distance can be obtained by measuring the number of pixels of the image of the staff in the width direction and referring to the table which shows the relationship between the number of pixel and the distance. Note that in case of the multi-stage telescopic staff, the width of the staff varies depending on the stage. To provide a more accurate automatic measurement, the width of the staff, and the value of the width of the staff for each stage, in the case of the multi-stage telescopic staff, are stored in the EEPROM 33 as staff data corresponding to the staff code number, and the stage which is to be used as a reference is input, for example, by an operator (user).

The distance of the staff can be measured in accordance with the axial position of the focusing lens group L2 in the focused state. Therefore, it is possible to provide a detection device for detecting the position of the focusing lens group L2 to thereby determine whether the first staff 101 is in the minor pixel number area or major pixel number area in accordance with the position of the focusing lens group L2 detected by the detection device.

The selection of the series of large characters 103 in the minor pixel number area upon leveling will be discussed with reference to FIG. 7. FIG. 7 shows the picked-up images of the numbers "6", "5", "4" of the series of large characters in the 2000 mm range. In FIG. 7, the horizontal line 53 represents the abscissa and the vertical line 52 represents the ordinate.

The distance between the ordinates jmax (jmax1 through jmax 3) of the upper sides of the numbers of the series of large characters 103 and the horizontal line 53 is obtained, for example, by the formula (j0–jmax), since the coordinates of the horizontal line are (i, j0). Note that if jmax is not greater than j0, the formula (j0–jmax) is used. The number of the series of large characters 103 which gives the smallest difference (absolute value |jmax–j0|) between the ordinate jmax (jmax1 through jmax3) and the horizontal line 53 (j0) is selected. Thus, the amount of data upon measuring the scale 105 is reduced. Note that the ordinates of the numbers at the left and right ends thereof in the horizontal direction are imin and imax, respectively.

Figure 8:
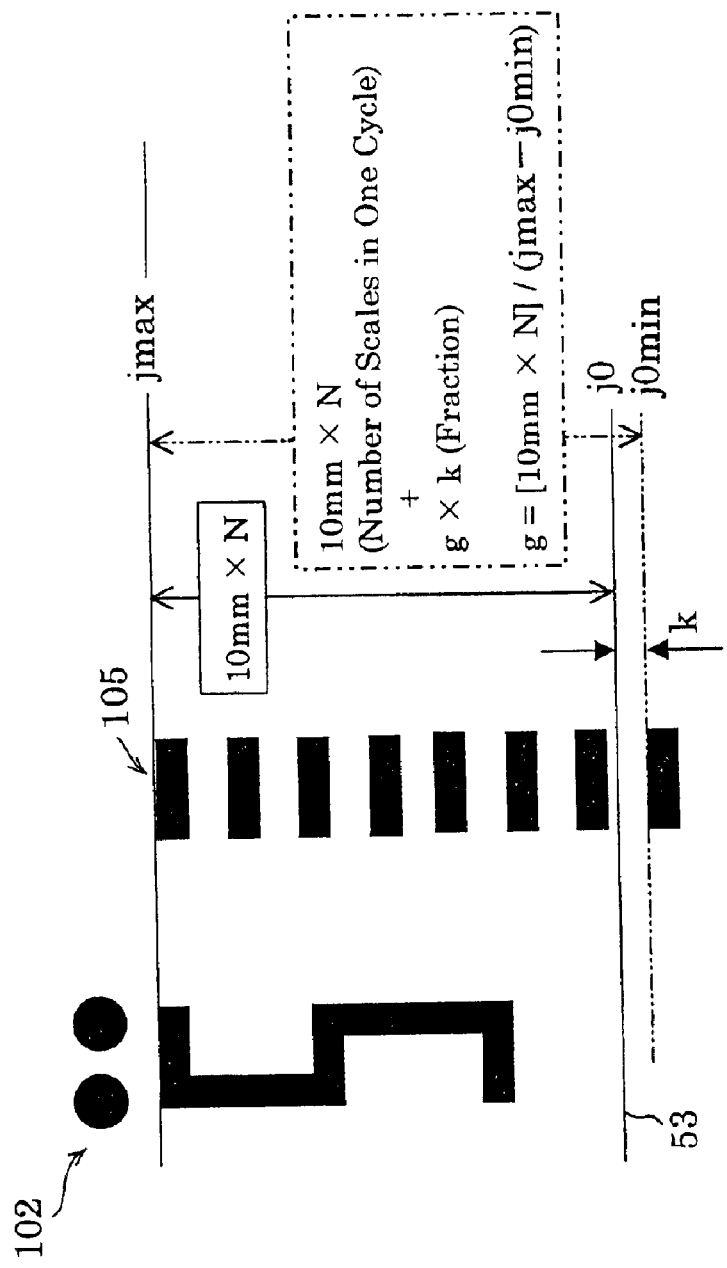
FIG. 8 is a timing chart of a reading operation of scales of upper and lower stadia lines in the digital level shown in FIG. 1.

When a number of the series of large characters 103 is selected, the scale 105 located between the coordinates of the upper side of the selected number and the horizontal line 53 are measured using a fractional calculation method. The principle of the fractional calculation method will be explained for the leveling operation shown in FIG. 8. In FIG. 8, for clarity, the number "5" of the series of large characters 103 is selected.

<Fractional Calculation Method>

In the fractional calculation, the number of the light and dark images of the scale 105 between the y-ordinate (jmax) of the upper side of the number "5" and the horizontal line 53 (j0) is counted. If the number of the light and dark images is not an integer, i.e., if the number is greater than an integer N but smaller than N+1, the horizontal line 53 is moved at each pixel to a position which is located before a position in which the number of the light and dark images is N+1, by a distance corresponding to one pixel. For example, the pixel data is checked for each pixel line to determine coordinates at which the number of the light and dark images becomes an integer. The horizontal line 53 can be moved either in the upward direction or in the downward direction. The horizontal line 53 is preferably moved in a direction wherein the number of the light and dark images increases, since the measurement precision generally is enhanced when the movement occurs in such a direction. Assuming that the ordinate when the number of the light and dark images is an integer is jmin, the conversion scale g can be obtained by the following equation:

$$g=(N)*10/\{(jmax-j0min)*p)\} \quad (3).$$

In FIG. 8, a=2, b=5, c=N+1, and hence the horizontal level L0 is obtained by the following equation (4):

$$LO=2*1000+5*100+(N)*10-g*k \quad (4);$$

wherein k=jmax–j0min, i.e., K is identical to an address difference.

The level L0 can be automatically measured up to a value smaller than the minimum unit of 10 mm, of the scale 105 by the above-described fractional calculation method.

In a stadia surveying operation, if the minor pixel number area has been selected, likewise with a leveling operation, the values of the upper and lower stadia lines 54 and 55 are obtained (i.e., the values au and al in thousands of millimeters, the values bu and bl in hundreds of millimeters, the values cu and cl in tens of millimeters, and the values du and dl smaller than tens of millimeters are obtained). Consequently, the distance can be obtained based on these values and the extension stadia multiplier Sc'. The variables du and dl are determined by g*(jumax–jg), and g*(jlmax–jb), respectively, wherein jumax designates the coordinates of the extension upper stadia line 54e when the number of the light and dark images from the upper side of the number of the series of large characters 103 closest to the upper stadia line 54 is an integer, and jlmax designates the coordinates of the extension lower stadia line 55e when the number of the light and dark images from the upper side of the number of the series of large characters 103 closest to the lower stadia line 55 is an integer.

The fractional calculation method in a stadia surveying operation (distance measurement), in the case of the major pixel number area being selected, will be discussed further with reference to timing charts shown in FIG. 9 (9A through 9F). According to the feature of this embodiment, the number of the scale 105 between the stadia lines 54 and 55 is measured to obtain a stadia distance.

FIGS. 9A through 9F show scanning timing charts of the area sensors in the vertical direction, upon a distance measurement. The first staff 101 is scanned upward from below the graduated face thereof. FIG. 9A shows the reading signal of the minimum value of the scale 105, FIG. 9B shows an array of pixels in the vertical direction, FIG. 9C shows the sampling signals of the pixels representing the luminance, FIG. 9D shows a square wave of the sampling signals which have been subjected to a binary operation and a rectangular operation for each pixel, FIG. 9E shows a pixel array of the area sensor 21, and FIG. 9F shows the coordinates of the reference stadia lines (upper and lower stadia lines 54 and 55) and the extension stadia lines 54e and 55e.

The reference stadia refers to a stadia distance defined by the focal length of the objective optical system of the collimating telescope divided by the stadia multiplier Sc of the telescope (focal length/stadia multiplier).

The extension stadia refers to a stadia distance which is obtained by varying (increasing or reducing) the reference stadia distance so that the number of the scale images (light and dark images) existing between the reference stadia lines is an integer. As mentioned above, the extension stadia multiplier Sc' is represented by:

Focal Length/Extension Stadia Distance

In FIG. 9D, the high level portion of the square wave represents the image height of the black band portion of the scale 105, and the low level portion of the square wave represents the image height of the white portion of the scale 105. First, whether or not an integer number of the square waves exists between the stadia lines 54 and 55 is detected. In FIG. 9D, there are only two high level portions and three low level portions of the square wave. Therefore, the addresses of the upper stadia line 54 and the lower stadia line 55 are moved to detect the address at which the number of the high level portions is identical to the number of the low level portions. In FIGS. 9A through 9F, when m upper stadia lines 54 and n lower stadia lines 55 are moved, the same number (four) of the high level portions and low level portions of the square waves are included between the extension stadia lines 54e and 55e.

Figure 10A:
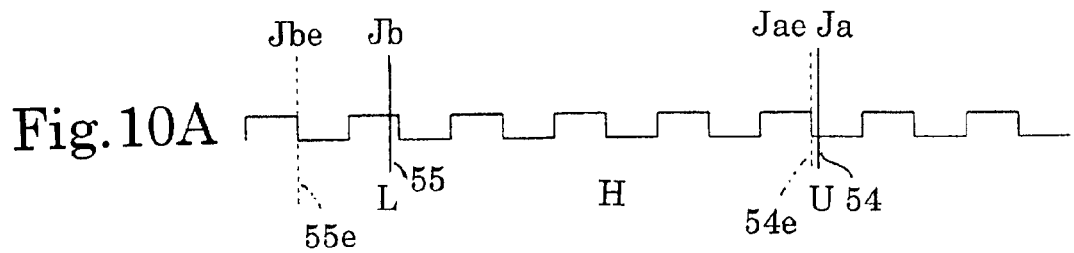
FIGS. 10A through 10D are timing charts showing different relationships between upper and lower stadia lines and scales in a digital level shown in FIG. 1.

The timing charts when the reference stadia lines 54e and 55e and the scale 105 overlap in different ways are shown in FIGS. 10A through 10D. In FIG. 10A, if the level of the upper stadia line 54 is low, the upper stadia line 54 is moved in a direction to decrease the address Ja of the upper stadia line 54, so that the address Jae corresponding to the high level is set to be an address of the extension upper stadia line 54e. If the level of the lower stadia line 55 is high, the lower stadia line 55 is moved in a direction to decrease the address Jb of the lower stadia line 55, so that the address Jbe just before the address at which the level which has been low becomes high is set to be the address of the extension lower stadia line 55e. The number of the high level portions between the stadia lines 54 and 55 is the same as that between the extension stadia lines 54e and 55e. Thus, the fractional calculation of the extension stadia distance is carried out according to the following equation:

$$\text{Extension Stadia Distance} = \text{No. of high level portions} * 10(\text{mm}) + (Ja - Jae) + (Jb - Jbe) * g(\text{mm}) \quad (5\text{-}1)$$

Since even one pixel of high level contributes to an increment of the number of the high level portions of the data in the memory, the extension is carried out so that both the reference stadia distance and the extension stadia distance have the same number of high level portions and the same integer cycle. With this method, in any case, the number of the high level portions does not vary in the extension stadia distance, so that the stadia distance can be maintained.

Note that the conversion scale of one pixel is:

$$g = (\text{No. of high level portions} * 10(\text{mm})) / (Jae - Jbe);$$

wherein $(Jae - Jbe)$ designates the address difference between the extension stadia lines 54e and 55e. The same is true in the following expressions for the extension stadia distance.

Figure 10B:
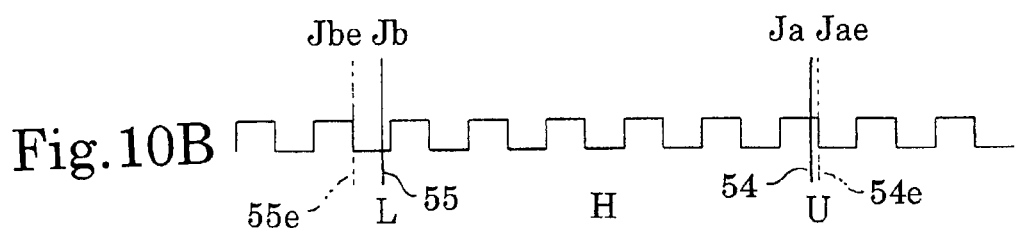

FIG. 10B shows an embodiment in which the upper stadia line 54 is moved in a direction to increase the address Ja thereof and the lower stadia line 55 is moved in a direction to reduce the address Jb thereof. In this embodiment, the fractional calculation of the extension stadia distance is carried out according to the following equation:

$$\text{Extension stadia distance} = \text{No. of high level portions} * 10(\text{mm}) + (Jae - Ja) + (Jb - Jbe) * g(\text{mm}) \quad (5\text{-}2).$$

Figure 10C:
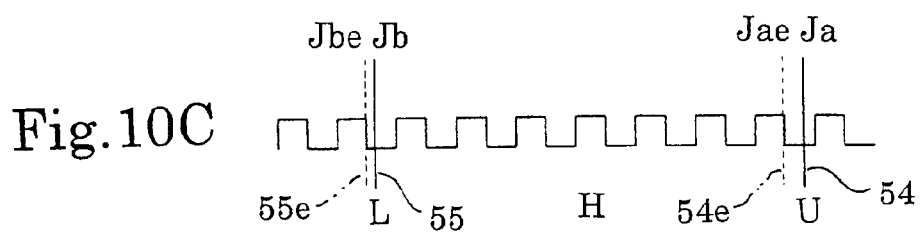

FIG. 10C shows an embodiment in which the upper stadia line 54 is moved in a direction to reduce the address Ja thereof and the lower stadia line 55 is moved in a direction to reduce the address Jb thereof. In this embodiment, the fractional calculation of the extension stadia distance is carried out according to the following equation:

$$\text{Extension stadia distance} = \text{No. of high level portions} * 10(\text{mm}) + (Ja - Jae) + (Jb - Jbe) * g(\text{mm}) \quad (5\text{-}2).$$

Figure 10D:
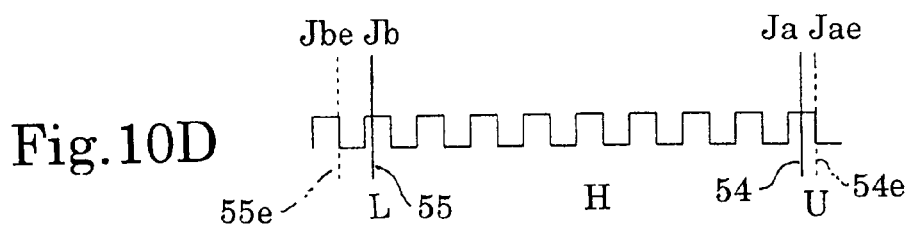

FIG. 10D shows an embodiment in which the upper stadia line 54 is moved in a direction to increase the address Ja thereof and the lower stadia line 55 is moved in a direction to reduce the address Jb thereof. In this embodiment, the fractional calculation of the extension stadia distance is carried out according to the following equation:

$$\text{Extension stadia distance} = \text{No. of high level portions} * 10(\text{mm}) + (Jae - Ja) + (Jb - Jbe) * g(\text{mm}) \quad (5\text{-}4).$$

The stadia distance can be obtained based on the extension stadia distance thus obtained, using the following equation:

$$\text{Stadia distance} = \text{Focal length} / \text{Extension Stadia Distance}$$

If the value of the scale 105 obtained by the fractional calculation is r and the values of the upper and lower stadia lines 54 and 55 are La and Lb, the following expressions are obtained:

$$La = 1000 * Au + 100 * Bu + 10 * Cu + 1 * Du$$

$$Lb = 1000 * Al + 100 * Bl + 10 * Cl + 1 * Dl$$

$$r = 1000 * (Au - Al) + 100 * (Bu - Bl) + 10 * (Cu - Cl) + 1 * (Du - Dl); \text{ wherein}$$

"Au" and "Al" designate the value of the long object distance pattern 102 closest to the upper and lower stadia lines 54 and 55, respectively; "Bu" and "Bl" designate the value of the series of large characters 103 closest to the upper and lower stadia lines 54 and 55, respectively; "Cu" designates the number of calibrations on the scale 105 between the reference position of the series of large characters 103 and the upper stadia line 54, and "Cl" designates the number of calibrations on the scale 105 between the reference position of the series of large characters 103 and the lower stadia line 55; and "Du" and "Dl" designate a fraction of a cycle which is calculated by a fraction calculation method with respect to the upper stadia line 54 and the lower stadia line 55, respectively.

If La and Lb are calculated with reference to the same character: $(Au - Al) = (Bu - Bl) = 0$; therefore, r is simply given by:

$$r = 10 * (Cu - Cl) + 1 * (Du - Dl).$$

Thus, if La and Lb are calculated with reference to the same digit, recognition thereof is not necessary.

In the embodiment shown in FIGS. 10A through 10D, since the extension stadia distance is measured based on the number of the cycles of the scale 105, and the fraction of the cycle number of the scale 105 is obtained by the fractional calculation process, it is not necessary to recognize the character pattern upon measuring the distance, regardless of the distance.

The digital measurement of the automatic survey system provided on the auto level 10 will be explained below with reference to a flow chart shown in FIG. 11. The operation in the flow chart shown in FIG. 11 is performed when an automatic survey start button is turned ON while the staff No. of the first staff 101 is selected via a keyboard 39 (see FIG. 3).

The main CPU 35 reads the staff code No. from the EEPROM 33 (S11). The staff code No. is selected in advance by the operator (user).

Thereafter, the area sensor 21 carries out an image pickup operation via the timing generator 23. The image signal output from the area sensor 21 is converted to a digital signal by the head amplifier/A-D converter 25, so that the image data for one frame is written in the first memory 27 (S13, S15).

The image data is read from the first memory 27 to confirm the binary data corresponding to the staff width (S17). The width of the staff image can be obtained by a coordinate difference (max–min) of the values (max and min) of the coordinates of the pixels whose contrast in the horizontal direction changes when a contrast calculation is performed. Consequently, if the width of the staff image is obtained, the binary block data (digital pixel data) of pattern block data, character block data, and scale block data can be obtained based on ratios between the staff width and the widths of each pattern, character and scale.

Different operations are carried out in accordance with the number of the pixels occupying the staff image in the width direction (S19). Analysis and recognition operations depending on the number of the occupying pixels are carried out in accordance with block data of the series of large characters and pattern block data, or block data of the series of small characters and pattern block data.

<The Major Pixel Number Area>

If the number of the occupying pixels of the staff image belongs to the major pixel number area (close distance area), the numbers of the series of small characters 104 and the scale 105 are recognized. Accordingly, a vertical direction contrast calculation is carried out; the maximum coordinate value (jmax), the minimum coordinate value (jmin) of the ordinate (j) of the area sensor 21 in the vertical direction, and the mean value are calculated; and the type of characters of the series of large characters 103 and the scale 105 are recognized based on the digital pixel block data (S21). The pixel address (i, j) is represented by x-y orthogonal coordinates (abscissa x–ordinate y), the origin (i0, j0) thereof being located on the center of the light receiving surface of the area sensor 21. The maximum value (jmax) and the minimum value (jmin) are located on the boundaries of the high luminance portion and the low luminance portion of the cut-out block data of each calibration, character and pattern in the direction of the y-axis. The mean value corresponds to the intermediate coordinates (max+min)/2 of the high luminance portion.

The value of the level rod of the scale which overlaps the horizontal line 53, i.e., the value "a" in meters, the value "b" in tens of centimeters, and the value "c" in centimeters are determined based on the recognized (detected) type of the character (S23).

Thereafter, the pixel data on the horizontal line 53, i.e., the pixel data at the reference address (i, j0) is confirmed, the value d in millimeters, or a fractions of a millimeter, is calculated based on the expression |jmax−j|, and the horizontal level L0 is calculated based on the values of "a", "b", "c", and "d", using equation (1) (S25).

Thereafter, the pixel data at the address (i, ja) of the upper stadia line 54 and the address (i, jb) of the lower stadia line 55 are confirmed, and the number of the light and dark images of the scale 105 including the fraction is calculated by the fractional calculation method.

Thereafter, the level is calculated using equation (4) and the distance is calculated using equations (5-1) through (5-4) (S29).

Subsequently, the level L0 and the distance thus obtained are indicated in the display 37, and the operation ends (S31).

<The Minor Pixel Number Area>

If the number of the occupying pixels of the staff image belongs to the minor pixel number area (far distance area), the long object-distance pattern 102, the series of large characters 103, and the scale 105 are recognized. Accordingly, a vertical direction contrast calculation is carried out, the maximum coordinate value (jmax), the minimum coordinate value (jmin) of the ordinate (j) of the area sensor 21 in the vertical direction, and the mean value are calculated, and the long object-distance pattern 102, the series of large characters 103, and the scale 105 are recognized based on the cut-out digital pixel block data (S34). The number of the long object-distance patterns 102 is recognized by the pattern recognition process, and the value "a" in meters is determined based on the number of the patterns (S35).

Thereafter, a large number in tens of centimeters is recognized by the character recognition process of the series of large characters 103 to thereby determine the value "b". (S37).

Thereafter, the pixel data on the horizontal line, i.e., the pixel data at the reference address (i, j0) is confirmed, the value "c" in centimeters, and the value "d" in millimeters, or fractions of a millimeter, is calculated based on the fractional calculation method (S39).

The address (i, ja) of the upper stadia line 54 is confirmed and the value cu in centimeters and the value du millimeters, or fractions of a millimeter, are determined based on the expression |jmax−ja|, and the upper stadia value La (au, bu, cu, and du) are calculated (S41).

Likewise, the address (i, jb) of the lower stadia line 55 is confirmed and the value cl in centimeters and the value dl in millimeters, or fractions of a millimeter, are determined based on the expression |jmax−jb|, and the lower stadia value Lb (al, bl, cl, and dl) are calculated (S43).

Thereafter, the level is calculated using equation (1), and the distance is calculated, based on the upper stadia value La and the lower stadia value Lb, using the equation (2) (S45).

The automatic measurement of the level and distance is determined by the above-mentioned operation. The level and distance thus obtained are indicated in the display 37, and the operation ends (S47).

According to the digital level 10 of the invention, the information of the graduated face of the first staff 101 is read and analyzed to determine and indicate the level and distance in the display 37. Consequently, in order to precisely measure the level and the distance, it is only necessary for the operator (user) to collimate first staff 101 set at a measuring point using the collimating telescope 11.

In the above description, the level and the distance are indicated. Alternatively, it is possible to store the measuring data in a detachable nonvolatile memory and to output the stored data to an external information device, such as a personal computer.

Figure 12:
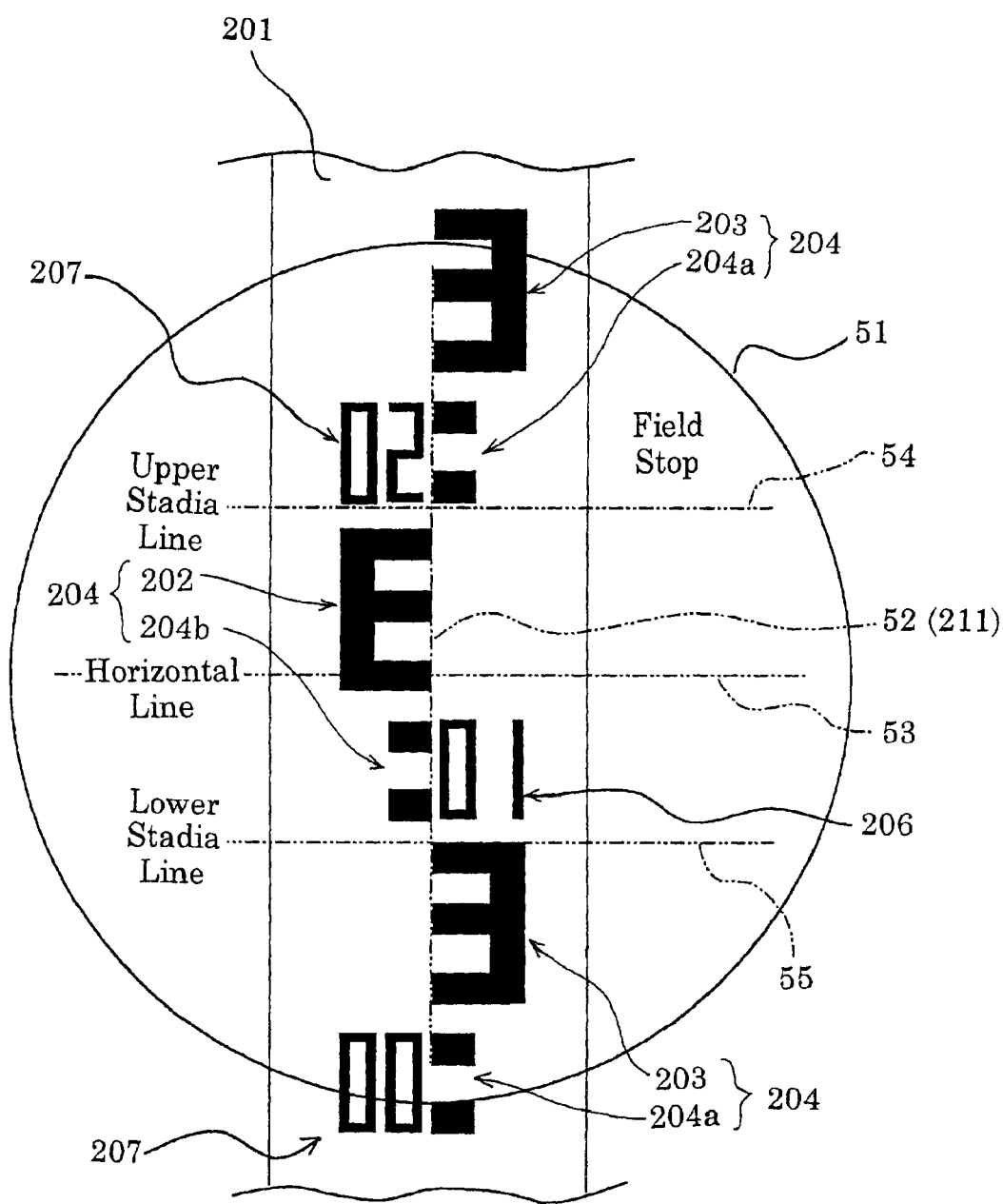
FIG. 12 is a view showing a relationship between a scale surface of a European staff, which is another example of an automatically readable staff, and the field of view of a collimating telescope, according to the present invention.

The following discussion will be addressed to an embodiment of a digital level 10 using a different type of scale. FIG. 12 shows a second staff 201 which is a European staff in which a scale 204 is arranged in tooth pattern at a pitch of 100 mm. The second staff 201 is provided on its graduated face with an E-shaped pattern 202 and tooth calibrations 204b arranged in the vertical direction on the left side of the center line 211, two-digit even numbers 207 on the left side of the center line 211, an inverted E-shaped pattern 203 and tooth calibrations 204a arranged in the vertical direction on the right side of the center line 211, and two-digit odd numbers 206 on the right side of the center line 211.

If the second staff 201 is used for indicating a level height between 1 m and approximately 5 m, the value "a" in thousands of millimeters and the value "b" in hundreds of millimeters are read by the two-digit odd numbers 206 and the two-digit even numbers 207. The value "c" in tens of millimeters is read by the E-shaped pattern 202 and the inverted E-shaped pattern 203 having one cycle of 20 mm. The value "d" in millimeters, or fractions of a millimeter, is obtained by the fractional calculation. The level is obtained by substituting the values "a", "b", "c" and "d", obtained for the horizontal line 53 in equation (1). The distance is obtained by substituting the value of au, bu, cu, du obtained for the upper stadia line 54 and the measurements al, bl, cl, dl obtained for the lower stadia line 55 in equation (2). Note that the data of the graduated face of the second staff 201 is stored in advance in the EEPROM 33 as data corresponding to the kind of staff.

The image of the graduated face of the second staff 201 is read by the area sensor 21, is converted to a digital signal by the head amplifier/converter 25, is analyzed by the image signal processing circuit 31 and the main CPU 35 to calculate an accurate level and distance, and is indicated in the display 37 (see FIG. 3). In the second staff 201, the distinguishability of the indicias (scale 204, two-digit odd and even numbers 206 and 207) is identical regardless of the distance since there is no substantial difference in the size of the indicias, therefore, it is possible for the same recognition algorithm to be used regardless of the distance. The principle of the operation of the digital level 10 will be discussed below with reference to the flow chart shown in FIG. 14.

The code corresponding to the selected staff No. is read (S51), the area sensor 21 is driven to pick up the image of the staff 201, and the image data of the graduated face of the staff 201 is retrieved (S53). The indication pattern of the staff 201 and the image of the characters are A/D-converted and stored in the first memory 27 (S55). The pattern image of the second staff 201 stored in the first memory 27 includes the E-shaped pattern 202 and the inverted E-shaped pattern 203. The E-shaped pattern 202 and the inverted E-shaped pattern 203 are alternately arranged in the vertical direction to form the scale 204. The images of the E-shaped pattern 202 and the inverted E-shaped pattern 203 are provided with the images of the two-digit numbers 206 and 207 attached thereto. The images of the E-shaped pattern 202 and the inverted E-shaped pattern 203 and the image of the two-digit odd and even numbers 206 and 207 are stored in the first memory 27 as image data.

The image data is read from the first memory 27 to confirm the binary signal level of the scale (E-shaped pattern 202 and inverted E-shaped pattern 203) 204, and the two-digit odd and even numbers 206 and 207, to thereby confirm whether the level belongs to the major pixel number area or the minor pixel number area (S57). The binary signals of character block data and scale block data corresponding to the staff code No. are cut out to calculate the maximum and minimum coordinates jmax and jmin and the mean coordinate value of each block data at the address (i, j) of the light receiving surface of the area sensor 21 (S59).

Thereafter, the image data of the E-shaped pattern 202 and the image data of the inverted E-shaped pattern 203 are cut out in blocks (block data) in accordance with the number of the occupying pixels, and the image data is inverted at the coordinate axis (i, j) of the light receiving surface of the area sensor 21 with respect to the minimum luminance coordinate imin of the E-shaped pattern 202, which constitutes a mirror inversion symmetry axis, so that the image data of the inverted E-shaped pattern 202' is rearranged in the second memory 29 (S61). The image data of the two-digit odd number 206 on the right side of the center line 211 is axial-symmetrically translated to the left side with respect to the minimum luminance coordinate imin of the E-shaped pattern 202 to constitute a translated two-digit odd number 206'. The tooth calibrations 204b is similarly translated to the right side with respect to the minimum luminance coordinate imin of the E-shaped pattern 202 to thereby constitute translated tooth calibrations 204b'. Consequently, series of the numbers including the translated two-digit odd numbers 206' and the two-digit even numbers 207 of the staff 201 are formed along the direction of the scale 204. Thus, in the second memory 29, the inverted E-shaped pattern 203, the tooth calibrations 204a and the tooth calibrations 204b of the scale 204, and the inverted E-shaped pattern 202' are arrayed in the vertical direction as shown in FIG. 13. Namely, a continuous binary scale is arranged in the second memory 29 as if the continuous binary scale actually exists. Consequently, the analysis and recognition of the scale 204, and the calculation of the level and distance can be carried out using the data stored in the second memory 29.

The scale/character block of the two-digit odd number 206 is recognized, based on the pattern in the second memory 29, the scale/character block of the two-digit odd number 206 is shifted laterally in with respect to the minimum coordinate jmin to constitute a translated two-digit odd number 206' which is aligned with the two-digit even number 207 in the vertical direction (S63).

Thereafter, the pixel data of the reference address (i, j0) is recognized based on the data in the second memory 29, the value smaller than "c" and "d" is determined based on the expression |jmax−j|, and the level L0 is calculated (S65).

Likewise, the pixel data of the upper stadia line address (i, ja) is recognized based on the data in the second memory 29, the value smaller than "c" and "d" is determined based on the expression |jmax−ja|, and the upper stadia line value La is calculated (S67).

Likewise, the pixel data of the lower stadia line address (i, jb) is recognized based on the data in the second memory 29, the value smaller than "c" and "d" is determined based on the expression |jmax−jb|, and the lower stadia line value Lb is calculated (S69).

The level L0 is determined by the operations mentioned above and the distance is determined by the expression |La−Lb| (S71). The level L0 and the distance thus obtained are indicated in the display 37, and the operation ends (S73).

Although the first memory 27 and the second memory 29 are used in the above-mentioned embodiments, it is possible to utilize different memory areas of a single memory.

As can be understood from the foregoing, the information of the graduated face of a staff is stored in advance in the EEPROM 33, so that the graduation information of the staff to be used can be read to analyze and recognize the picked-up image data to thereby automatically measure the level and the distance. The measured level and distance are indicated in the display. Consequently, it is possible to use a general-purpose staff in place of a special staff. The use of a general-purpose staff makes it possible for an operator to visually carry out the measurement.

As can be understood from the above discussion, recognition data regarding a predetermined pattern, numbers or the scale of a graduated face of a level rod can be read from the memory so that the picked-up images of the pattern, the number or the scale, of the level rod can be analyzed and recognized based on the recognition data and the image data of the level rod picked-up by the image pickup device to obtain measurements. Therefore, it is possible to use a general-purpose staff without preparing a special staff by storing the data for recognizing the pattern, the numbers or the scale of the graduated face in the memory.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An automatic surveying system comprising:

a telescopic optical system;

an image pickup device for picking up an image of a graduated face of a level rod, to which the telescopic optical system is to be collimated, and converting the image into image data;

a memory which stores recognition data of at least one of a pattern, numbers, and scale calibrations, provided on the graduated face of the level rod, said stored recognition data corresponding to a plurality of different kinds of level rods;

a selection device for selecting one of the plurality of different kinds of level rods; and an analyzer for analyzing and recognizing the picked-up image of said at least one of the pattern, numbers, and scale calibrations of the level rod, based on the image data of the level rod picked up by the image pickup device and the recognition data of said pattern, numbers, and scale calibrations corresponding to the selected kind of level rod, read from the memory, to obtain a measurement.

2. An automatic surveying system, according to claim 1, further comprising an indicator for indicating said measurement obtained by the analyzer.

3. An automatic surveying system according to claim 1, wherein said analyzer determines the amount of image data of said level rod in the image width direction based on the image data of the level rod, and performs the analysis based on the amount of the image data thus obtained.

4. An automatic surveying system according to claim 1, wherein said analyzer determines the amount of image data of said at least one of the pattern, numbers, and the scale calibrations in one of the image width direction and the image height direction, based on the image data of the level rod, and performs the analysis based on the amount of the image data thus obtained.

5. An automatic surveying system comprising:

a telescopic optical system;

an image pickup device for picking up an image of a graduated face of a level rod, to which the telescopic optical system is to be collimated, and converting the image into image data;

a memory which stores recognition data of at least one of a pattern, numbers, and scale calibrations, provided on the graduated face of the level rod;

an analyzer for analyzing and recognizing the picked-up image of said at least one of the pattern, numbers, and scale calibrations of the level rod, based on the image data of the level rod picked up by the image pickup device and the recognition data of said pattern, numbers, and scale calibrations read from the memory, to obtain a measurement; and an indicator for indicating said measurement obtained by said analyzer, wherein said analyzer recognizes the values of the pattern, numbers, and the scale calibrations which coincide with a predetermined reference line within the field of view of the telescopic optical system.

6. An automatic surveying system according to claim 5, wherein the telescopic optical system comprises an auto-level collimating telescope, said auto-level collimating telescope including an objective optical system; a focusing optical system; a compensating/erecting optical system, a focusing plate, and an eyepiece optical system, in that order from the object side; and a beam splitter which is provided between the compensating/erecting optical system and the focusing plate to split object image carrying light into one light bundle which is incident upon the eyepiece optical system and another light bundle which is incident upon the image pickup device.

7. An automatic surveying system according to claim 6, wherein said memory stores coordinates on a light receiving surface of an image pickup element on which a horizontal line and a stadia line of the focusing plate are to be formed, so that one of the coordinates of the graduated face of said level rod coincident with each line and the distance between the lines on the graduated face can be analyzed based on the stored coordinates and the coordinates of the image picked-up by the image pickup device, on the light receiving surface of the image pickup element.

8. An automatic surveying system according to claim 1, wherein said memory can store said measurement obtained by the analyzer.

9. An automatic surveying system, according to claim 5, further comprising an indicator for indicating said measurement obtained by the analyzer.

10. An automatic surveying system according to claim 5, wherein said analyzer determines the amount of image data of said level rod in the image width direction based on the image data of the level rod, and performs the analysis based on the amount of the image data thus obtained.

11. An automatic surveying system according to claim 5, wherein said analyzer determines the amount of image data of said at least one of the pattern, numbers, and the scale calibrations in one of the image width direction and the image height direction, based on the image data of the level rod, and performs the analysis based on the amount of the image data thus obtained.

12. An automatic surveying system according to claim 5, wherein said memory stores said measurement obtained by the analyzer.

* * * * *